United States Patent [19]

Musselman

[11] 3,906,443

[45] Sept. 16, 1975

[54] BICYCLE BRAKE INDICATING OR STOP LIGHT CIRCUITRY WITH SWITCH CONTACTS MOUNTED ON BRAKING ELEMENT

[76] Inventor: Don L. Musselman, 20600 Londelius St., Canoga Park, Calif. 91306

[22] Filed: Feb. 21, 1974

[21] Appl. No.: 444,474

[52] U.S. Cl. ............... 340/69; 188/24; 200/61.12; 200/164 R; 340/134
[51] Int. Cl.² .... B60Q 1/44; B62L 1/00; H01H 3/16
[58] Field of Search ... 188/24, 26; 200/52 R, 61.12, 200/61.54, 61.85–61.91, 157, 164 R; 240/7.6, 10.6 R, 10.6 SD, 6.4 R, 57, 58, 240/63–66; 340/52 B, 69, 81 R, 71, 134; 315/77, 78, 80

[56] References Cited
UNITED STATES PATENTS

| | | | |
|---|---|---|---|
| 2,486,042 | 10/1949 | Lesigne | 200/164 R X |
| 2,497,012 | 2/1950 | Pearl | 200/61.12 |
| 2,728,824 | 12/1955 | Whildin | 340/69 X |
| 3,188,418 | 6/1965 | Pino | 200/61.12 |
| 3,305,048 | 2/1967 | Brilando | 188/24 |

*Primary Examiner*—James R. Scott
*Attorney, Agent, or Firm*—Erik M. Arnhem

[57] ABSTRACT

An automatic brake light switch for bicycles, comprising electric wiring interconnecting light means and power source, detachably mounted onto a bicycle, the free ends of said wiring terminating in electric contact means; resiliently flanged attachment means, having a centered cut-out, for easy and secure mounting over and onto a brake pad, the length of said attaching means extending beyond the end surfaces of the brake pad; its two thusly overlapping ends are provided with holes through which two externally threaded tubes pass, each of which being securely maintained in its hole, by means of two internally threaded nuts threaded from opposite ends of the tube until firmly pressing against the peripheral surface of the hole.

The said wiring, consisting of two insulated wires, is caused to pass through said tubes with their said terminal electric contact means protruding outside the tube ends and lying substantially flush with the longitudinal lower contact surface of the brake pad; when the frictional brake pad is applied against the bicycle wheel rim, the electric contact means are simultaneously therewith caused to touch the metal wheel rim and thus close the circuit for the brake light, indicating that the bicycle rider is slowing down or stopping.

7 Claims, 6 Drawing Figures

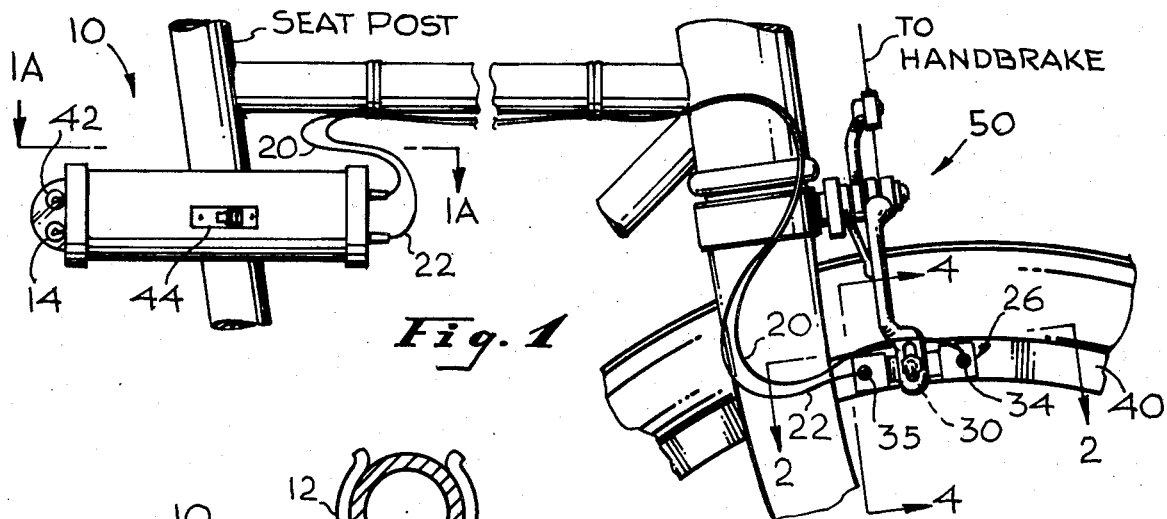
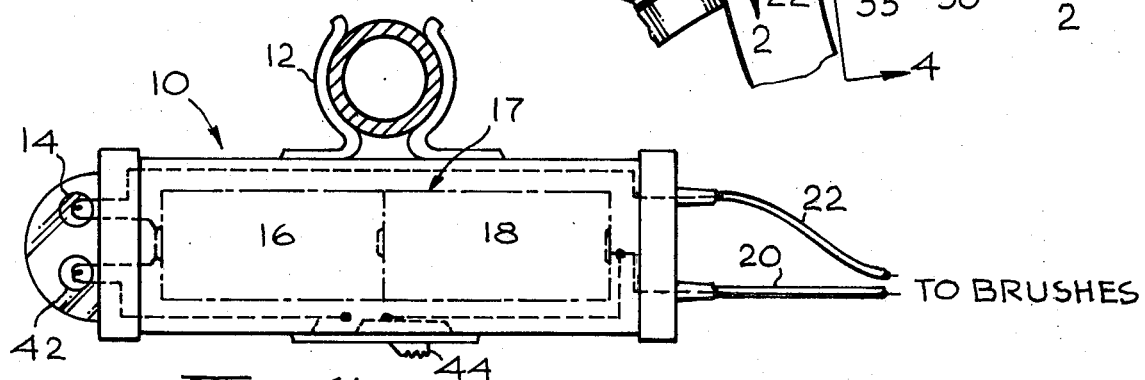
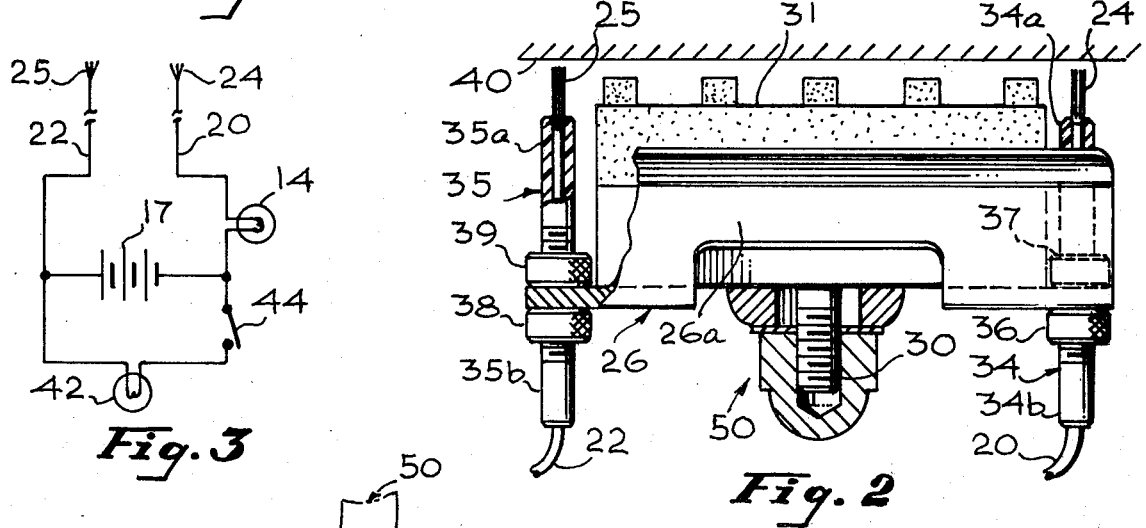
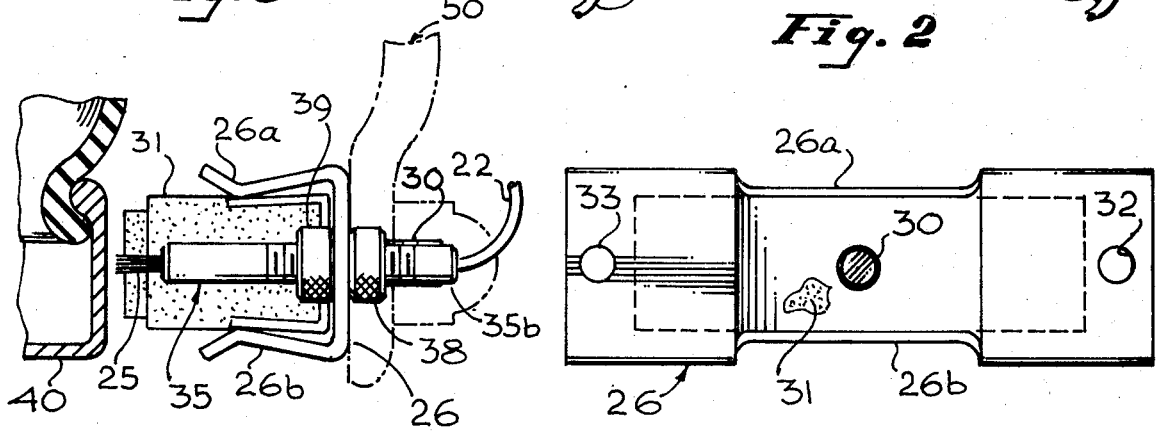

BICYCLE BRAKE INDICATING OR STOP LIGHT CIRCUITRY WITH SWITCH CONTACTS MOUNTED ON BRAKING ELEMENT

SUMMARY OF THE INVENTION

The invention utilizes the existing manual wheel brake, which is part of most standard bicycle accessories. Such manual brake systems basicly consist of a handle, attached adjacent to the steering rod, which— when squeezed— by way of rods or wires actuate a brake pad located near the wheel rim, causing the pad to apply itself frictionally against the wheel rim, thereby bringing the rotary motion of the wheel to a stop.

The invention constitutes a self-contained unit, which may be attached, easily and without any special mechanical skill, to the existing manual brake system of bicycles, and in the preferred embodiment of the invention comprises a housing, containing lighting means, electrically wired to batteries therewithin, holding means for easy attachment to an appropriate part of the bicycle, e.g. to the seat post. The two wires that interconnects the lighting power and batteries extend outside the housing along any desirable length of path on the bicycle frame to the location of the brake pad, being normally installed near one of the wheel rims, and terminate there in respective electrical contact means, e.g. brushes.

Resiliently flanged attachment means, with a centered cut-out portion, is mounted over the braking pad and the rod or wire, by way of which the pad is generally connected to the handle of the manual brake. The flanges of said attachment means, due to their resiliency, will clamp tight onto the side surfaces of the brake pad and thus assuring perfect and secure fitting thereon. The length of the top portion of the attachment means, lying onto the upper surface of the brake pad extends beyond the length of the latter. Each of the thusly overlapping two ends of the attachment means has a hole to receive a rather short piece of externally threaded sleeve or tube section, which is maintained fixedly within its respective hole, e.g., by means of two knurled nuts, respectively threaded on from opposite ends of the tube until tightly abutting each side of the peripheral area of the hole.

Each of the said insulated wires is respectively caused to pass, preferably with negligible clearance through the threaded sleeve, with its terminal contact brush projecting therefrom and lying substantially flush with the lower contact surface of the brake pad. The threaded sleeves are suitably made of a non-conducting material to prevent the exposed contact brushes from possibly being short-circuited therewith.

When the manual brake handle is pressed, causing the brake pad to move and frictionally apply itself against the wheel rim, the electrical contact brushes will simultaneously move along and also touch the wheel rim, thereby closing the circuit between the power supply and lighting means, causing the latter to light up.

The terminal brushes of the wires may be guided through the tubes in a compressed state, and will then expand somewhat when protruding outside the tubes, preventing them from sliding rearwardly. Optionally, the terminal brushes may be attached to the wire ends, subsequently to their passing through the tubes. It is preferred that the batteries are located within the housing together with the light bulb and wiring, although one could conceivably attach the bulb and batteries at separate suitable locations on the bicycle, as will be explained in more detail further on. The housing containing light and/or batteries is provided with attachment means, e.g., a spring clip, for easy and conspicuous mounting or any desirable place on the bicycle.

In another embodiment of the invention, there are accommodated two bulbs within the circuit of the device; the additional bulb, intended as a night light, is switched on and off manually, e.g., by way of a standard flash light switch, attached to the housing; it is, by way of separate wiring, connected to and fed by the same batteries within the housing, and is thusly, operable independently by the brake light.

It is thus the primary object of the invention to provide a self-contained automatically operating brake light unit, which is mountable on virtually any style or model of bicycles.

It is a further object of the invention to furnish a brake light, which may quickly be installed by a technically unskilled person, at any desirable and conspicuous place on the bicycle.

It is still a further object of the invention to provide a lighting unit for bicycles, which incorporate braking as well as night lights.

The invention also comprises novel details of construction and novel combinations and arrangements of parts, which will more fully appear in the course of the following summary, which is based on the accompanying drawings. However, said drawings merely show, and the following description merely describes, preferred embodiments of the present invention; which are given by way of illustration or example only.

BACKGROUND OF THE INVENTION

The applicants call attention to the following prior United States Letters Patent:

| No. | | |
|---|---|---|
| No. 3,382,405 | H. S. Johnson | May 7, 1968 |
| No. 2,299,762 | C. McDermott | October 27, 1942 |
| No. 3,753,000 | J. J. Newman | August 14, 1973 |
| No. 3,271,621 | J. A. McDermott | September 6, 1966 |

Johnson refers to a transistorized electronic switch mechanism, including a Zener diode to limit the conduction of the switching transistor.

C. McDermott discloses a bicycle light, fed by a secondary source, when the generator is inoperable.

Newman concerns a rechargeable lighting system for bicycles.

J. A. McDermott refers to a flashing light adaptable to a motor vehicle.

None of the above cited patents disclose, individually or in combination, the basic features of my invention, namely, an automatic brake light, of simple construction, easily mountable and detachable and operable in co-action with the application of the hand brake.

BRIEF DESCRIPTION OF THE DRAWINGS

In the drawings, like reference characters designate similar parts in the several views.

FIG. 1 is a top sectional view of the housing component of the invention, containing lighting, wiring and power supply means, attached to the seat post of a bicycle.

FIG. 1a is a side view of a portion of a bicycle frame on which the lighting device is mounted.

FIG. 2 is a side view of the attachment means mounted over the brake pad, partially broken away and taken on line 2—2 of FIG. 1a.

FIG. 3 is a diagram, illustrating the wiring of an additional light into the circuit.

FIG. 4 is a front view of FIG. 2 taken on line 4—4 of FIG. 1a.

FIG. 5 is a top view of the attachment means of FIG. 2.

DESCRIPTION OF THE INVENTION

Referring to FIG. 1 of the drawing numeral 10 indicates the housing, provided with mounting means 12, e.g. a spring clip for easy attachment to the seat post of a bicycle and having lighting means, e.g., a first bulb 14, electrically interconnected with batteries 16, 18 by way of two insulated wires 20, 22, the latter extending outside the housing 10 along, and being attached to, a portion of the bicycle frame, and terminating in electrical contact means 24, 25 e.g., brushes as indicated on FIG. 2 of the drawings. A second bulb 42 is continuously energized by batteries 16, 18 but is not connected up with the wiring of bulb 14 or the braking functions of the bicycle, as will be explained in detail further on. Bulb 42 is manually actuated by switch 44. FIG. 1a illustrates the housing 10, containing the bulbs, batteries and portions of the wiring, mounted to the seat post, the wires 20, 22, leading outwardly to the front part of the bicycle and passing through the tubes 34, 35 are inserted in attachment means 26, the latter being mounted on the brake pad 31, which is connected to the brake assembly 50 and co-act with a manual brake lever, (not shown).

In FIG. 2, a resiliently flanged attachment means 26 having a centered cut-out portion 28 is mounted over a standard rod 30, guiding brake pad 31 (which usually is mounted movable near the metal wheel rim of the bicycle in co-action with the manual brake handle applying frictional pressure on the wheel rim for braking purposes), clamping securely onto the latter. The primary purposes of the cut-out 28 and resilient flanges 26, 26b (FIG. 4) are to allow for varying types of existing brake pads, so that the attachment means 26 can be mounted on varying sizes of and differently shaped brake pads.

As is seen from FIG. 5, the length of attachment means 26 extend beyond the length of the longitudinal surface of the brake pad (shown by hatched lines). Each of the two thusly overlapping end portions of attachment means 26 have a hole 32, 33. Threaded tubes or sleeves 34, 35 (FIG. 2) are respectively, placed in the holes 32, 33 and firmly maintained therein by appropriate means, e.g., by threading nuts 36, 37 and 38, 39, respectively threaded on from opposite ends of the sleeves 34 and 35, until the pairs of nuts 36, 37 and 38, 39 press tightly against the opposite peripheral surfaces of holes 32 and 33, respectively.

The insulated wires 20, 22 with terminal electric brushes 24, 25 are respectively caused to pass through the upper portions of 34b, 35b of the sleeves 34, 35, tightly and frictionally fitting therewithin to prevent the wires from sliding forwardly or rearwardly within the fixedly located sleeves. As indicated on FIG. 4, the electric brush 25 lies substantially flush with the bottom surface of the brake pad 31, which, when inactive, is disposed spacedly from the wheel rim 40.

In a further embodiment of the disclosure, the batteries and lighting means, interconnected by wiring, may also be accommodated in separate housings, as indicated in FIG. 3 although it is preferable that they are assembled within one housing.

Furthermore, it would, as noted above, also be possible to independently incorporate a second light, e.g. acting as a permanent night light 42, preferably adjacent light bulb 14, which may also be wired to and fed by the batteries 16, 18.

A manual switch 44 (e.g. of the flash-light type) may then close or break the independent circuit of light 42, and thus activate the latter, regardless of the braking action of brake pad 32.

The invented device operates in the following manner:

When the bicycle rider squeezes the manual handle, co-acting with the brake pad mounted adjacent one of the metal wheel rims, so as to cause the brake pad to frictionally apply itself as a braking force against the wheel rim, the two electric brushes 24, 25 projecting from the lower portions 34a, 35a of the tubes 34 and 35, respectively, will simultaneously move along with the brake pad 31, causing them to touch the metal wheel rim and thus to close the circuit of the wires 20, 22. The electric brushes thus act as an electric switch causing bulb 14 to light up, on contact with the metal wheel rim.

While the foregoing has illustrated and described what is now contemplated to be the best mode of carrying out the invention, the constructions are, of course, subject to modifications without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A lighting device mountable on a bicycle and the like, visually responsive to engagement of a braking pad with a metallic wheel rim arranged thereon, by means of a manual lever operation, comprising:
   a. light means;
   b. power supply means electrically connected with the light means;
   c. attachment means having a cut-out portion for mounting over and longitudinally overlapping the end surfaces of the brake pad, each of said overlapping portions having an aperture;
   d. two tubes each of which is mounted, respectively, in the apertures of the attachment means;
   e. a first wire, one end of which is electrically connected to said light means, the other free end of which is caused to pass through the upper inlet of one of the tubes;
   f. a second wire, one end of which is electrically connected to said power supply means, the other free end of which is caused to pass through the upper inlet of the other tube;
   g. two electric contact means attached, respectively to the free ends of the first and second wires, and projecting outside the lower outlets of the two tubes, so as to lie substantially flush with the lower end surfaces of the brake pad and co-acting simultaneous therewith to engage the metallic wheel rim by means of the manual lever operation, whereby an electric circuit is closed between the contact means and the wheel rim, causing electric current to flow through the wires, the power supply means and light means, causing the light means to light up.

2. A stop light device mountable on a bicycle, comprising
   a. light means;
   b. power supply means electrically connectible to the light means;
   c. a metallic rim mounted on a wheel of the bicycle;
   d. a brake pad mounted responsive to mechanical pressure on a part of the bicycle near the rim;
   e. attachment means having a cut-out portion for mounting over and longitudinally overlapping the end surfaces of the brake pad, each of the overlapping portions thereof having an aperture;
   f. two tubes inserted respectively in the apertures of the overlapping portions of the attachment means;
   g. a first wire, one end of which is electrically connected to said light means, the other free end of which is caused to pass through the upper inlet of one of the tubes;
   h. a second wire, one end of which is electrically connected to said power supply means, the other free end of which is caused to pass through the upper inlet of the other tube;
   i. two electric contact means attached, respectively to the free ends of the first and second wires and projecting therefrom outside the lower outlets of the two tubes, so as to lie flush with the lower end surfaces of the brake pad, co-acting responsive to mechanical pressure, simultaneous therewith to engage the metallic rim, whereby an electric circuit is closed between the contact means and the metallic rim causing electric current to flow through the wires, the power supply means and to the light means to light up the light means.

3. A stop light device mountable on a bicycle, according to claim 2, in which the two tubes are threaded externally and maintained rigidly within their respective hole in the overlapping portion of the attachments, by means of a pair of internally threaded nuts threaded on from opposite ends of each tube until tightly abutting the opposite peripheral surfaces of the hole.

4. A stop light device mountable on a bicycle, according to claim 2, in which said attachment means is provided with resilient flanges for tight clamping onto the surfaces of the brake pad.

5. A stop light device mountable on a bicycle, according to claim 2, in which said tubes are made of electrically insulating non-conducting material.

6. A stop light device mountable on a bicycle, according to claim 2, in which the lighting means and the power supply means are accommodated on the bicycle within a housing, provided with a resilient clamping clip for attachment onto a part of the bicycle.

7. A stop light device mountable on a bicycle, according to claim 2, in which a second lighting means is provided being continuously energized by the power supply means independent of the braking function of the bicycle and actuated by way of a manual switch.

\* \* \* \* \*